US012535832B2

United States Patent
Niu (10) Patent No.: US 12,535,832 B2
(45) Date of Patent: Jan. 27, 2026

(54) OBSTACLE AVOIDANCE METHOD FOR SELF-PROPELLED DEVICE, MEDIUM, AND SELF-PROPELLED DEVICE

(71) Applicant: Beijing Roborock Innovation Technology Co., Ltd., Beijing (CN)

(72) Inventor: Yansheng Niu, Beijing (CN)

(73) Assignee: Beijing Roborock Innovation Technology Co., Ltd., Beijing (CN)

( * ) Notice: Subject to any disclaimer, the term of this patent is extended or adjusted under 35 U.S.C. 154(b) by 60 days.

(21) Appl. No.: 18/288,714

(22) PCT Filed: Mar. 9, 2022

(86) PCT No.: PCT/CN2022/080017
§ 371 (c)(1),
(2) Date: Oct. 27, 2023

(87) PCT Pub. No.: WO2022/227877
PCT Pub. Date: Nov. 3, 2022

(65) Prior Publication Data
US 2025/0076888 A1 Mar. 6, 2025

(30) Foreign Application Priority Data
Apr. 27, 2021 (CN) .......................... 202110460945.1

(51) Int. Cl.
*G05D 1/622* (2024.01)
*A47L 11/40* (2006.01)
(Continued)

(52) U.S. Cl.
CPC .......... *G05D 1/622* (2024.01); *A47L 11/4011* (2013.01); *G01S 17/931* (2020.01);
(Continued)

(58) Field of Classification Search
CPC .............. G05D 1/622; G05D 2105/10; G05D 2111/17; G05D 2111/50; G05D 2107/40;
(Continued)

(56) References Cited

U.S. PATENT DOCUMENTS

| 2008/0065265 A1 | 3/2008 | Ozick et al. |
| 2017/0042115 A1 | 2/2017 | Van Den Beukel et al. |

(Continued)

FOREIGN PATENT DOCUMENTS

| CN | 105982624 A | 10/2016 |
| CN | 106154012 A | 11/2016 |

(Continued)

OTHER PUBLICATIONS

Extended European Search Report issued in corresponding European Patent Application No. 22794356.0, dated Jan. 14, 2025.
(Continued)

*Primary Examiner* — Michael J Zanelli
(74) *Attorney, Agent, or Firm* — Morgan, Lewis & Bockius LLP (57) ABSTRACT

Provided are an obstacle avoidance method for a self-propelled device, a medium, and a self-propelled device. The method includes acquiring a suspension height of an obstacle on a current travel route during traveling; determining whether the suspension height of the obstacle is within a preset limited height range, wherein the preset limited height range enables a part of the self-propelled device to pass the suspension height and an other part of the self-propelled device is limited by the suspension height; and acquiring, in response to determining that the suspension height of the obstacle is within the preset limited height range, current traveling state information of the self-pro-
(Continued)

pelled device, and determining whether to adjust the current travel route based on the current traveling state information to avoid the obstacle.

18 Claims, 4 Drawing Sheets

(51) Int. Cl.
  *G01S 17/931* (2020.01)
  *G05D 105/10* (2024.01)
  *G05D 111/10* (2024.01)
  *G05D 111/50* (2024.01)
(52) U.S. Cl.
  CPC ...... *A47L 2201/04* (2013.01); *G05D 2105/10* (2024.01); *G05D 2111/17* (2024.01); *G05D 2111/50* (2024.01)
(58) Field of Classification Search
  CPC .. G05D 2109/10; G05D 1/242; G05D 1/0236; G05D 1/0223; G05D 1/024; G05D 1/0242; G05D 1/0251; G05D 1/0261; G05D 1/028; A47L 11/4011; A47L 2201/04; A47L 11/24; A47L 11/40; A47L 11/4002; A47L 11/4061; G01S 17/931; G06V 20/58; G06V 20/64; G06V 10/00; Y02T 10/72
  See application file for complete search history.

(56) References Cited

U.S. PATENT DOCUMENTS

| | | | |
|---|---|---|---|
| 2017/0332862 A1 | 11/2017 | Jun et al. | |
| 2018/0344114 A1* | 12/2018 | Scholten | G05D 1/03 |
| 2019/0064832 A1 | 2/2019 | Tang | |
| 2019/0104908 A1* | 4/2019 | He | A47L 11/4002 |
| 2021/0200234 A1* | 7/2021 | Song | G05D 1/0238 |
| 2022/0061616 A1* | 3/2022 | Yoon | A47L 11/4061 |

FOREIGN PATENT DOCUMENTS

| | | | | |
|---|---|---|---|---|
| CN | 106725143 A | | 5/2017 | |
| CN | 206633020 U | | 11/2017 | |
| CN | 108814442 A | | 11/2018 | |
| CN | 108968815 A | | 12/2018 | |
| CN | 109276193 A | | 1/2019 | |
| CN | 110477810 A | | 11/2019 | |
| CN | 110507248 A | | 11/2019 | |
| CN | 111339956 A | | 6/2020 | |
| CN | 111381594 A | | 7/2020 | |
| CN | 111538342 A | | 8/2020 | |
| CN | 111562567 A | | 8/2020 | |
| CN | 111631652 A | | 9/2020 | |
| CN | 111728534 A | | 10/2020 | |
| CN | 112232201 A | | 1/2021 | |
| CN | 113189993 A | | 7/2021 | |
| CN | 113558523 A | * | 10/2021 | |
| EP | 3076845 B1 | * | 2/2019 | A47L 11/4011 |
| JP | 2018-061703 A | | 4/2018 | |
| KR | 20210136685 A | * | 11/2021 | |
| WO | 2019/199098 A1 | | 10/2019 | |
| WO | 2020/251274 A1 | | 12/2020 | |

OTHER PUBLICATIONS

International Search Report (with partial translation) dated May 20, 2022, issued in corresponding International Patent Application No. PCT/CN2022/080017.
First Office Action dated Oct. 10, 2022, issued in corresponding Chinese Patent Application No. CN202110460945.1.
Office Action issued in corresponding European Patent Application No. 22794356.0, dated Oct. 31, 2025.

\* cited by examiner

OBSTACLE AVOIDANCE METHOD FOR SELF-PROPELLED DEVICE, MEDIUM, AND SELF-PROPELLED DEVICE

CROSS-REFERENCE TO RELATED APPLICATIONS

This application is a U.S. national phase filing under 35 U.S.C. § 371 claiming the benefit of PCT international application No. PCT/CN2022/080017, filed on Mar. 9, 2022, which claims priority of the Chinese Patent Application No. 202110460945.1, filed on Apr. 27, 2021, both of which are incorporated herein by reference in their entireties.

TECHNICAL FIELD

The present disclosure relates to the field of robot technologies, and in particular, to an obstacle avoidance method for a self-propelled device, a medium and a self-propelled device.

BACKGROUND

With the development of technologies, various intelligent robots have appeared, such as sweeping robots, mopping robots, vacuum cleaners and weeders. These robots can automatically identify the sweeping routes, and select a sweeping mode according to the sweeping route, which not only frees labor force, but also reduces labor costs.

A sweeping robot often encounters a stuck situation during a sweeping process. For example, the robot may be stuck under a suspending obstacle such as a piece of furniture. In the subsequent sweeping process, the sweeping robot may still be stuck when it reaches the stuck position.

SUMMARY

According to a first aspect of the present disclosure, an obstacle avoidance method for a self-propelled device is provided, including:
  acquiring a suspension height of an obstacle on a current travel route during traveling;
  determining whether the suspension height of the obstacle is within a preset limited height range, wherein the preset limited height range enables a part of the self-propelled device to pass the suspension height and another part of the self-propelled device is limited by the suspension height; and
  acquiring, in response to the suspension height of the obstacle being within the preset limited height range, current traveling state information of the self-propelled device, and determining whether to adjust the current travel route based on the current traveling state information to avoid the obstacle.

According to some embodiments, acquiring the suspension height of the obstacle on the current travel route includes:
  acquiring, by a structured light assembly arranged in the self-propelled device, the suspension height of the obstacle on the current travel route.

According to some embodiments, acquiring the suspension height of the obstacle on the current travel route by the structured light assembly arranged in the self-propelled device includes:
  emitting, by a line structured light sensor of the structured light assembly, at least one beam of line structured light to the current travel route;
  acquiring, by a camera of the structured light assembly, an image including the at least one beam of line structured light;
  generating, based on a plurality of images including the at least one beam of line structured light, three-dimensional space information of the obstacle on the current travel route; and
  obtaining the suspension height of the obstacle based on a positional relationship between the three-dimensional space information of the obstacle and three-dimensional space information of an entire field of view.

According to some embodiments, when the self-propelled device is on a horizontal plane and the line structured light sensor emits a plurality of beams of line structured light, at least two beams of line structured light of the plurality of beams of line structured light have an intersection line perpendicular to the horizontal plane.

According to some embodiments, acquiring the current traveling state information of the self-propelled device, and determining whether to adjust the current travel route of the self-propelled device based on the current traveling state information, includes:
  acquiring the current traveling state information of the self-propelled device; and
  determining to adjust the current travel route in response to the current traveling state information including surmounting-obstacle state information.

According to some embodiments, the current traveling state information includes: a driving current value of a traveling wheel of the self-propelled device and a displacement speed value of the self-propelled device on the current travel route,
  acquiring the current traveling state information of the self-propelled device, and determining whether to adjust the current travel route based on the current traveling state information, includes:
  acquiring, in response to the self-propelled device traveling to a position of the obstacle, the driving current value and the displacement speed value of the self-propelled device; and
  determining to adjust the current travel route in response to the driving current value being greater than a preset first abnormal current threshold and the displacement speed value being zero.

According to some embodiments, the current traveling state information includes: a driving current value of a traveling wheel of the self-propelled device, a rotational speed value of the traveling wheel and a displacement speed value of the self-propelled device on the current travel route;
  acquiring the current traveling state information of the self-propelled device, and determining whether to adjust the current travel route based on the current traveling state information, includes:
  acquiring, in response to the self-propelled device traveling to a position of the obstacle, the driving current value, the displacement speed value and the rotational speed value of each traveling wheel of the self-propelled device;
  obtaining a second abnormal current threshold based on a preset first abnormal current threshold and a preset percentage; and
  determining to adjust the current travel route in response to the driving current value being greater than a preset normal current threshold and being less than the second abnormal current threshold, and the displacement speed value being mismatched with the rotational speed value of at least one traveling wheel.

According to some embodiments, the method further includes:

acquiring and marking a position of the obstacle.

According to some embodiments, the method further includes:

transmitting the position of the obstacle to a cloud server or a local server; or saving the position of the obstacle in a memory of the self-propelled device.

According to a second aspect of the present disclosure, an obstacle avoidance apparatus for a self-propelled device is provided, including:

an acquisition unit configured to acquire a suspension height of an obstacle on a current travel route during traveling;

a judgement unit configured to determine whether the suspension height of the obstacle is within a preset limited height range, wherein the preset limited height range enables a part of the self-propelled device to pass the suspension height and an other part of the self-propelled device is limited by the suspension height; and a determination unit configured to acquire, in response to the suspension height of the obstacle being within the preset limited height range, current traveling state information of the self-propelled device, and determine whether to adjust the current travel route based on the current traveling state information to avoid the obstacle.

According to some embodiments, the acquisition unit includes:

an acquisition sub-unit configured to acquire the suspension height of the obstacle on the current travel route by a structured light assembly arranged in the self-propelled device.

According to some embodiments, the acquisition sub-unit includes:

an emission sub-unit configured to emit at least one beam of line structured light to the current travel route by a line structured light sensor of the structured light assembly;

an image acquisition sub-unit configured to acquire an image including the at least one beam of line structured light by a camera of the structured light assembly;

a generation sub-unit configured to generate three-dimensional space information of the obstacle on the current travel route based on a plurality of images including the at least one beam of line structured light; and a height obtaining sub-unit configured to obtain the suspension height of the obstacle based on a positional relationship between the three-dimensional space information of the obstacle and three-dimensional space information of an entire field of view.

According to some embodiments, when the self-propelled device is on a horizontal plane and the line structured light sensor emits a plurality of beams of line structured light, at least two beams of line structured light of the plurality of beams of line structured light have an intersection line perpendicular to the horizontal plane.

According to some embodiments, the determination unit includes:

a first acquisition sub-unit configured to acquire the current traveling state information of the self-propelled device; and a surmounting-obstacle adjustment sub-unit configured to determine to adjust the current travel route in response to the current traveling state information comprising surmounting-obstacle state information.

According to some embodiments, the current traveling state information includes: a driving current value of a traveling wheel of the self-propelled device and a displacement speed value of the self-propelled device on the current travel route:

acquiring the current traveling state information of the self-propelled device, and determining whether to adjust the current travel route based on the current traveling state information, includes:

a second acquisition sub-unit configured to acquire, in response to the self-propelled device traveling to a position of the obstacle, the driving current value and the displacement speed value of the self-propelled device; and an overcurrent adjustment sub-unit configured to determine to adjust the current travel route in response to the driving current value being greater than a preset first abnormal current threshold and the displacement speed value being zero.

According to some embodiments, the current traveling state information includes: a driving current value of a traveling wheel of the self-propelled device, a rotational speed value of the traveling wheel and a displacement speed value of the self-propelled device on the current travel route;

acquiring the current traveling state information of the self-propelled device, and determining whether to adjust the current travel route based on the current traveling state information, includes:

a third acquisition sub-unit configured to acquire, in response to the self-propelled device traveling to a position of the obstacle, the driving current value, the displacement speed value and the rotational speed value of each traveling wheel of the self-propelled device;

a threshold obtaining sub-unit configured to obtain a second abnormal current threshold based on a preset first abnormal current threshold and a preset percentage; and a skidding adjustment sub-unit configured to determine to adjust the current travel route in response to the driving current value being greater than a preset normal current threshold and being less than the second abnormal current threshold, and the displacement speed value being mismatched with the rotational speed value of at least one traveling wheel.

According to some embodiments, the apparatus further includes:

a marking unit configured to acquire and mark a position of the obstacle.

According to a third aspect of the present disclosure, a computer-readable storage medium storing a computer program thereon is provided. When the program is executed by a processor, the method as described in any one of the above embodiments is realized.

According to a fourth aspect of the present disclosure, an electronic device is provided. The electronic device includes one or more processors and a storage device configured to store one or more programs, which, when executed by the one or more processors, enables the one or more processors to implement the method as described in any one of the above embodiments.

DETAILED DESCRIPTION

To make the objects, technical solutions and advantages of the present disclosure clearer, the present disclosure will be further described in detail below with reference to the accompanying drawings. It is obvious that the described embodiments are only part but not all the embodiments of the present disclosure. All other embodiments obtained by those of ordinary skill in the art without creative efforts based on the embodiments in the present disclosure fall within the scope of the present disclosure.

The terms used in the embodiments of the present disclosure are for the purpose of describing particular embodiments only and are not intended to limit the present disclosure. The singular forms "a/an", "said" and "the" used in the embodiments of the present disclosure and the appended claims are intended to include the plural forms as well, unless the context clearly indicates otherwise. The term "a plurality of" generally refers to at least two.

It should be understood that the term "and/or" used herein merely describes an association relationship of associated objects, and indicates that there may be three relationships. For example, A and/or B may indicate three cases: A exists separately, A and B exist at the same time, and B exists separately. In addition, the character "/" herein generally indicates an "or" relationship between the associated objects before and after the character.

It should be understood that although the terms "first", "second", "third", etc. may be used to describe the embodiments of the present disclosure, such descriptions should not be limited by these terms. These terms are only used to distinguish one from the other. For example, the first may also be referred to as the second without departing from the scope of the embodiments of the present disclosure. Similarly, the second may also be referred to as the first.

Depending on the context, the word "if" as used herein may be interpreted as "when", "at the time of . . . " or "in response to determining . . . " or "in response to detecting . . . ". Similarly, depending on the context, the phrases "if it is determined that" or "if it is detected that (the stated condition or event)" may be interpreted as "when it is determined that" or "in response to determining that" or "when it is detected that (the stated condition or event)" or "in response to detecting (the stated condition or event)".

It should also be noted that the terms "includes," "contains," or any other variants thereof are intended to refer to a non-exclusive inclusion, such that the commodities or devices including a series of elements not only include those elements, but also include other elements not expressly listed, or also include the inherent elements of such commodities or devices. Without further limitation, the element defined by the phrase "including a/an . . . " does not exclude the existence of other identical elements in the commodity or device that includes such element.

Optional embodiments of the present disclosure are described in detail below with reference to the drawings.

A first embodiment of the present disclosure provides an obstacle avoidance method for a self-propelled device.

Figure 1:
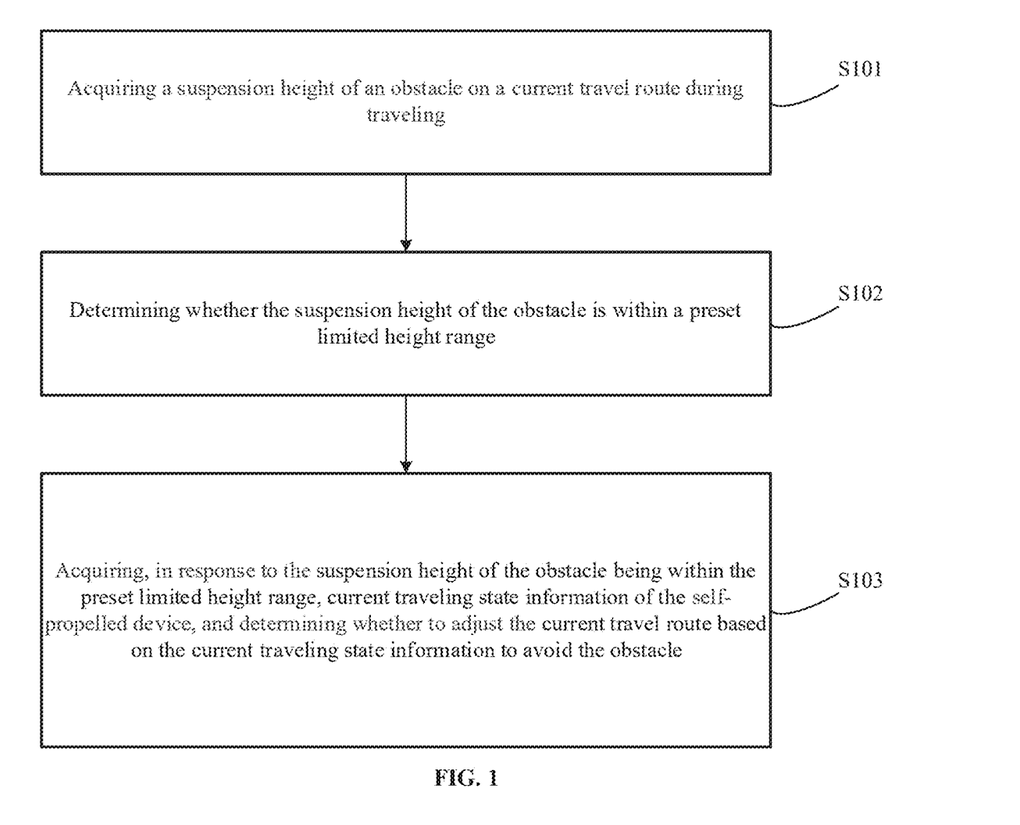
FIG. 1 is a flowchart of an obstacle avoidance method for a self-propelled device according to an embodiment of the present disclosure.

This embodiment of the present disclosure is described in detail below with reference to FIG. 1.

An embodiment of the present disclosure provides a possible application scenario including a self-propelled device, such as a sweeper (or a sweeping machine or a sweeping robot), a mopper (or a mopping machine or a mopping robot), a vacuum cleaner and a weeder. In some embodiments, a household sweeper is taken as an example. During the working process of the sweeper, the sweeper cleans the floor in a home according to a pre-planned travel route. However, it may inevitably encounter some suspending obstacles in the home, for example, the bottom of a sofa, the bottom of a piece of European-style furniture, etc., and the sweeper may or may not be able to pass the suspending obstacle. As a laser distance sensor (LDS) arranged on the top of the sweeper can only detect the distance from obstacles at the same height, and cannot detect the heights of surrounding obstacles, the detection has many limitations and the suspending obstacles cannot be effectively avoided. In view of such problems, the embodiment of the present disclosure provides an obstacle avoidance method, which enables the self-propelled device to avoid the suspending obstacles when walking along a current travel route.

Embodiment 1

Step S101, acquiring a suspension height of an obstacle on a current travel route during traveling.

The current travel route may refer to a preset route or an automatically planned route. As the artificial intelligence level of current self-propelled devices is becoming higher and higher, self-propelled devices can plan their travel routes for completing tasks in advance based on historical route information. Take a sweeper as an example, the current travel route is a travel route required for cleaning the rooms.

An embodiment of the present disclosure provides a method for detecting a suspension height of an obstacle for solving the problem that a self-propelled device cannot avoid a suspending obstacle.

In some specific embodiments, acquiring the suspension height of the obstacle on the current travel route includes the following steps.

Step S101*a*, acquiring, by a structured light assembly arranged in the self-propelled device, the suspension height of the obstacle on the current travel route.

Figure 3:
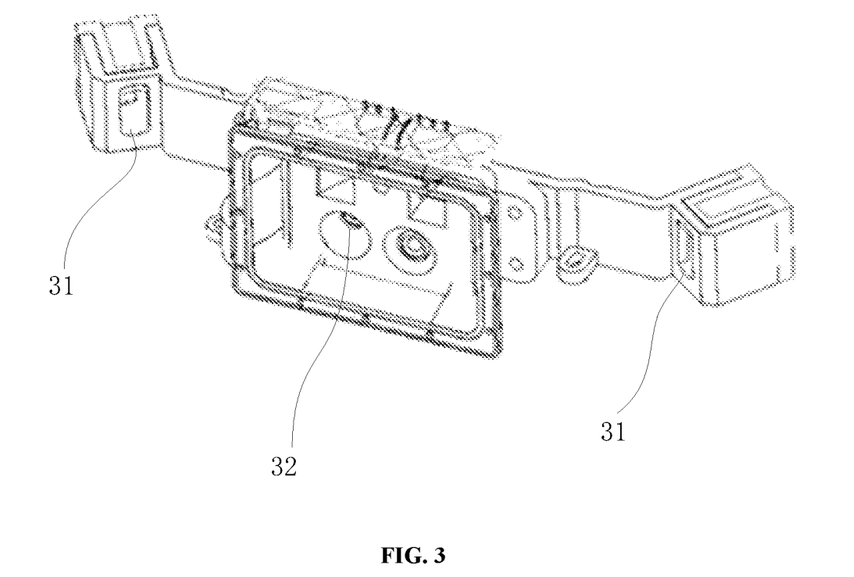
FIG. 3 shows a line structured light assembly according to an embodiment of the present disclosure.

The structured light assembly may include a light sensor and a camera 32 (see FIG. 3). The light sensor may include a point structured light sensor, a line structured light sensor 31 or a surface structured light sensor. The point structured light sensor emits light in the form of a point. The line structured light sensor 31 emits light in the form of a line. The surface structured light sensor emits light in the form of a surface.

Specifically, acquiring the suspension height of the obstacle on the current travel route by the structured light assembly arranged in the self-propelled device includes the following steps.

Step S101*a*-1, emitting, by the line structured light sensor 31 of the structured light assembly, at least one beam of line structured light to the current travel route.

For example, the line structured light sensor 31 emits at least one sine stripe to the outside.

Step S101a-2, acquiring an image by a camera 32 of the structured light assembly.

The image includes the line structured light. For example, continuing with the above example, when an obstacle appears on the current travel route, the camera 32 captures an image in which sine stripes are illuminated onto the obstacle (including suspending obstacles and obstacles on the ground). The image includes a deformation degree of the sine stripes modulated by the profile of the obstacle.

The modulation methods include a temporal modulation and a spatial modulation. The temporal modulation includes a time-of-flight method, which records the flight time of the optical pulse in space, and resolves surface contour information of the object to be detected based on the flight time. In the spatial modulation method, phase information and light intensity information of a field of view of the structured light will be changed by height modulation of the obstacle, and surface contour information of the object to be detected can be obtained by reading the changes in the information.

Step S110a-3, generating, based on a plurality of images including the at least one beam of line structured light, three-dimensional space information of the obstacle on the current travel route.

For example, continuing with the above example, phase of the obstacle can be obtained by demodulating the deformed sine stripes in the above image, and the phase is then converted into three-dimensional space information of an entire field of view.

Step S101a-4, obtaining the suspension height of the obstacle based on a positional relationship between the three-dimensional space information of the obstacle and three-dimensional space information of an entire field of view.

According to some embodiments, when the self-propelled device is on a horizontal plane and the line structured light sensor 31 emits a plurality of beams of line structured light, at least two beams of line structured light of the plurality of beams of line structured light have an intersection line perpendicular to the horizontal plane.

For example, as shown in FIG. 3, the structured light assembly includes at least two line structured light sensors 31 which are arranged on the outside of the self-propelled device and are respectively arranged at horizontal positions on two sides of the camera 32 for emitting line structured light to the outside. When the self-propelled device is traveling on the horizontal ground, two beams of line structured light have an intersection line perpendicular to the horizontal plane, thereby simplifying the step of generating three-dimensional space information and improving the calculation efficiency. According to some embodiments, the line structured light includes linear infrared light.

Step S102, determining whether the suspension height of the obstacle is within a preset limited height range.

Figure 2:
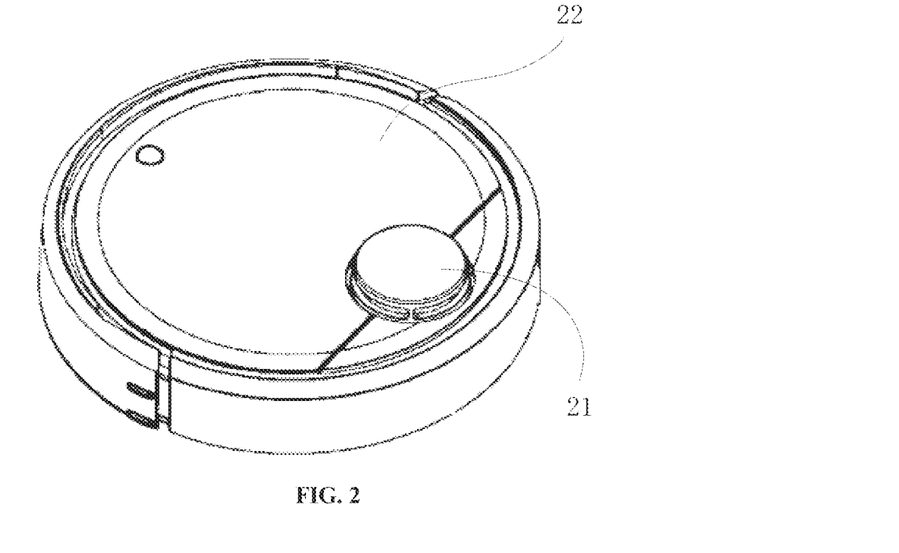
FIG. 2 shows an LDS arranged at the top of a sweeper according to an embodiment of the present disclosure.

If the suspension height of the obstacle is within the preset limited height range, a part of the self-propelled device is able to pass the height, while the other part of the self-propelled device is limited by the height. For example, as shown in FIG. 2, the LDS 21 arranged at the top of the sweeper is raised above the sweeper top platform 22, so the LDS 21 can move vertically in a certain extent due to touching. The preset limited height range includes a range from the lowest height of the bottom of the LDS 21 to the highest height of the top of the LDS 21. When the suspension height is within the preset limited height range, as the sweeper top platform 22 is lower than the suspension height, the sweeper top platform 22 can pass the suspending obstacle. However, as the LDS 21 is above the suspension height, the sweeper may not be able to pass the suspending obstacle. For example, if the suspending obstacle is a door curtain, the sweeper can push through the door curtain by increasing the driving current applied to the traveling wheels and continue traveling along on the current travel route. Alternatively, if the suspending obstacle is a hard object, the LDS 21 of the sweeper is compressed in height upon collision with the suspending obstacle, and then the sweeper can pass the suspending obstacle and continue traveling along the current travel route. However, if the LDS 21 is still unable to lower than the suspension height after being compressed in height, the sweeper will be prevented from traveling along the current travel route, and in severe cases, will become stuck in the suspending object.

Step S103, acquiring, in response to the suspension height of the obstacle being within the preset limited height range, current traveling state information of the self-propelled device, and determining whether to adjust the current travel route based on the current traveling state information to avoid the obstacle.

In a specific embodiment, acquiring the current traveling state information of the self-propelled device, and determining whether to adjust the current travel route based on the current traveling state information, includes the following steps.

Step S103a-1, acquiring the current traveling state information of the self-propelled device.

Step S103a-2, determining to adjust the current travel route in response to the current traveling state information including surmounting-obstacle state information.

The surmounting-obstacle state is a state in which the self-propelled device surmounts an obstacle. For example, when the sweeper surmounts a threshold, if a suspending object ahead along the current travel route is detected, and the suspension height of the suspending object is within the preset restriction height range, the travel route is adjusted so as to complete the current task.

In another specific embodiment, the current traveling state information includes: a driving current value of a traveling wheel of the self-propelled device and a displacement speed value of the self-propelled device on the current travel route.

Accordingly, acquiring the current traveling state information of the self-propelled device, and determining whether to adjust the current travel route based on the current traveling state information, includes the following steps.

Step S103b-1, acquiring, in response to the self-propelled device traveling to a position of the obstacle, the driving current value and the displacement speed value of the self-propelled device.

Step S103b-2, determining to adjust the current travel route in response to the driving current value being greater than a preset first abnormal current threshold and the displacement speed value being zero.

The preset first abnormal current threshold is understood relative to a preset normal current value range. Under normal conditions, the driving current value of the traveling wheel is within the preset normal current value range. When the self-propelled device needs to speed up, for example, when the self-propelled device needs to surmount an obstacle, or there is a door curtain ahead with a suspension height within the preset limited height range, the driving current value needs to be increased to be above the preset first abnormal current threshold (i.e., a preset overcurrent threshold), so that the kinetic energy of the self-propelled device can be increased to allow the self-propelled device to pass the obstacle. However, when the driving current value is larger than the preset overcurrent threshold, the displacement speed value of the self-propelled device at the position of the obstacle is zero, which can be understood as the self-propelled device being stuck at the position of the obstacle. In this case, the travel route needs to be adjusted so as to complete the current task.

In another specific embodiment, the current traveling state information includes: a driving current value of a traveling wheel of the self-propelled device, a rotational speed value of the traveling wheel and a displacement speed value of the self-propelled device on the current travel route.

Accordingly, acquiring the current traveling state information of the self-propelled device, and determining whether to adjust the current travel route based on the current traveling state information, includes the following steps.

Step S103c-1, acquiring, in response to the self-propelled device traveling to a position of the obstacle, the driving current value, the displacement speed value and the rotational speed value of each traveling wheel of the self-propelled device.

Step S103c-2, obtaining a second abnormal current threshold based on a preset first abnormal current threshold and a preset percentage.

The preset first abnormal current threshold is the preset overcurrent threshold. For example, the second abnormal current threshold is the product of the preset first abnormal current threshold and the preset percentage. When the preset percentage is 100%, the second abnormal current threshold equals to the preset first abnormal current threshold.

Step S103c-3, determining to adjust the current travel route in response to the driving current value being greater than a preset normal current threshold and being less than the second abnormal current threshold, and the displacement speed value being mismatched with the rotational speed value of at least one traveling wheel.

To prevent the self-propelled device from becoming stuck tinder the obstacle and not being able to disengage due to excessive speed, this embodiment of the present disclosure provides a trial passing method, in which the driving current value of the traveling wheel is controlled to be larger than the preset normal current threshold and smaller than the second normal current threshold, and a relatively low driving current is utilized to pass the obstacle.

A mismatch between the displacement speed value of the self-propelled device on the current travel route and the rotational speed value of at least one traveling wheel, i.e. skidding of at least one traveling wheel at the position of the obstacle, can be interpreted that the self-propelled device is slightly stuck at the position of the obstacle. In this case, the travel route needs to be adjusted so as to complete the current task.

According to some embodiments, the preset percentage is set as 70%.

The method according to the embodiment of the present disclosure further includes the following step.

Step S104, acquiring and marking a position of the obstacle.

The position of the obstacle can be marked for reference for the next travel route planning to realize automatic obstacle avoidance. For example, the sweeper transmits the position of the sofa bottom blocking the travel route to a cloud server or a local server, or such position is saved in the memory of the sweeper, so that the suspending obstacle formed by the sofa bottom at this position can be automatically avoided next time.

In the embodiment of the present disclosure, an obstacle is avoided by determining whether a suspension height of the obstacle is within the preset limited height range, and determining whether to adjust the current travel route based on the current traveling state information of the self-propelled device. It avoids the limitation of planning a travel route based solely on a distance from the obstacle detected at the sane height, and improves the effectiveness of route planning.

Embodiment 2

The present disclosure also provides an apparatus embodiment consistent with the above embodiment for realizing the steps of the method of the above embodiment. Interpretations of the names in the present embodiment same as those in the above embodiment are the same as interpretations in the above embodiment, and the same technical effect as that in the above embodiment can be achieved, which will not be repeated herein.

Figure 4:
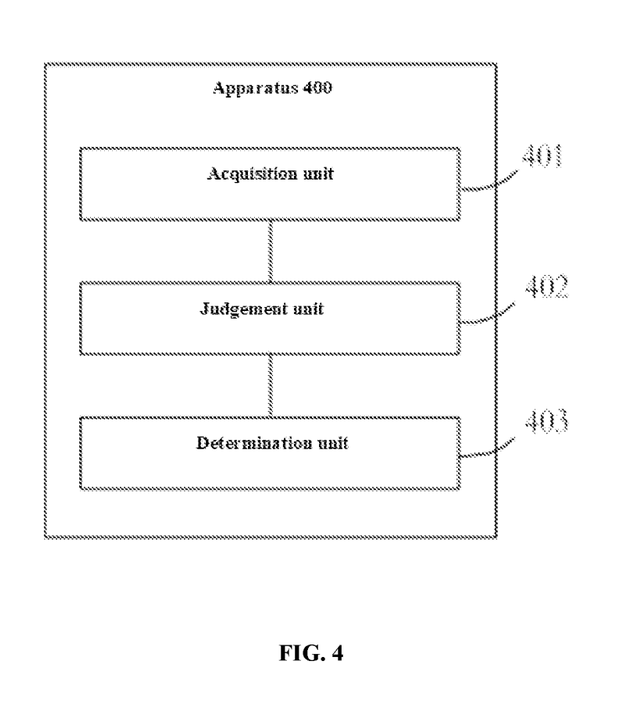
FIG. 4 shows a block diagram of an obstacle avoidance apparatus for a self-propelled device according to an embodiment of the present disclosure.

As shown in FIG. 4, the present disclosure provides an obstacle avoidance apparatus 400 for a self-propelled device, including:

an acquisition unit 401 configured to acquire a suspension height of an obstacle on a current travel route during traveling;

a judgement unit 402 configured to determine whether the suspension height of the obstacle is within a preset limited height range, wherein the preset limited height range enables a part of the self-propelled device to pass the suspension height and an other part of the self-propelled device is limited by the suspension height; and a determination unit 403 configured to acquire, in response to the suspension height of the obstacle being within the preset limited height range, current traveling state information of the self-propelled device, and determine whether to adjust the current travel route based on the current traveling state information to avoid the obstacle.

According to some embodiments, the acquisition unit 401 includes:

an acquisition sub-unit configured to acquire the suspension height of the obstacle on the current travel route by a structured light assembly arranged in the self-propelled device.

According to some embodiments, the acquisition sub-unit includes:

an emission sub-unit configured to emit at least one beam of line structured light to the current travel route by a line structured light sensor of the structured light assembly;

an image acquisition sub-unit configured to acquire an image including the at least one beam of line structured light by a camera of the structured light assembly;

a generation sub-unit configured to generate three-dimensional space information of the obstacle on the current travel route based on a plurality of images including the at least one beam of line structured light; and a height obtaining sub-unit configured to obtain the suspension height of the obstacle based on a positional relationship between the three-dimensional space information of the obstacle and three-dimensional space information of an entire field of view.

According to some embodiments, when the self-propelled device is on a horizontal plane and the line structured light sensor emits a plurality of beams of line structured light, at least two beams of line structured light of the plurality of beams of line structured light have an intersection line perpendicular to the horizontal plane.

According to some embodiments, the determination unit 403 includes:
- a first acquisition sub-unit configured to acquire the current traveling state information of the self-propelled device; and
- a surmounting-obstacle adjustment sub-unit configured to determine to adjust the current travel route in response to the current traveling state information including surmounting-obstacle state information.

According to some embodiments, the current traveling state information includes: a driving current value of a traveling wheel of the self-propelled device and a displacement speed value of the self-propelled device on the current travel route;
- acquiring the current traveling state information of the self-propelled device, and determining whether to adjust the current travel route based on the current traveling state information, includes:
- a second acquisition sub-unit configured to acquire, in response to the self-propelled device traveling to a position of the obstacle, the driving current value and the displacement speed value of the self-propelled device; and
- an overcurrent adjustment sub-unit configured to determine to adjust the current travel route in response to the driving current value being greater than a preset first abnormal current threshold and the displacement speed value being zero.

According to some embodiments, the current traveling state information includes: a driving current value of a traveling wheel of the self-propelled device, a rotational speed value of the traveling wheel and a displacement speed value of the self-propelled device on the current travel route;
- acquiring the current traveling state information of the self-propelled device, and determining whether to adjust the current travel route based on the current traveling state information, includes:
- a third acquisition sub-unit configured to acquire, in response to the self-propelled device traveling to a position of the obstacle, the driving current value, the displacement speed value and the rotational speed value of each traveling wheel of the self-propelled device;
- a threshold obtaining sub-unit configured to obtain a second abnormal current threshold based on a preset first abnormal current threshold and a preset percentage; and
- a skidding adjustment sub-unit configured to determine to adjust the current travel route in response to the driving current value being greater than a preset normal current threshold and being less than the second abnormal current threshold, and the displacement speed value being mismatched with the rotational speed value of at least one traveling wheel.

According to some embodiments, the apparatus further includes:
- a marking unit configured to acquire and mark a position of the obstacle.

In the embodiment of the present disclosure, an obstacle is avoided by determining whether a suspension height of the obstacle is within a preset limited height range, and determining whether to adjust a current travel route based on current traveling state information of the self-propelled device. It avoids the limitation of planning a travel route based solely on a distance from the obstacle detected at the same height, and improves the effectiveness of route planning.

The respective units of the obstacle avoidance apparatus 400 for a self-propelled device can be realized by software or a combination of software and hardware. For example, a program module may be stored in a memory. Functions of the respective units can be realized by a processor running the program module. Alternatively, the functions of the respective units can be realized by a hardware circuit (such as an ASIC).

Embodiment 3

An embodiment of the present disclosure provides an electronic device which includes one or more processors and a memory in communication connection with the one or more processors. The memory stores instructions executable by the one or more processors. When the instructions are executed by the one or more processors, the steps of the methods of any one of the above embodiments can be performed by the one or more processors.

Embodiment 4

An embodiment of the present disclosure provides a non-volatile computer storage medium storing computer-executable instructions which can be used to execute the steps of the methods of any one of the above embodiments.

Embodiment 5

Figure 5:
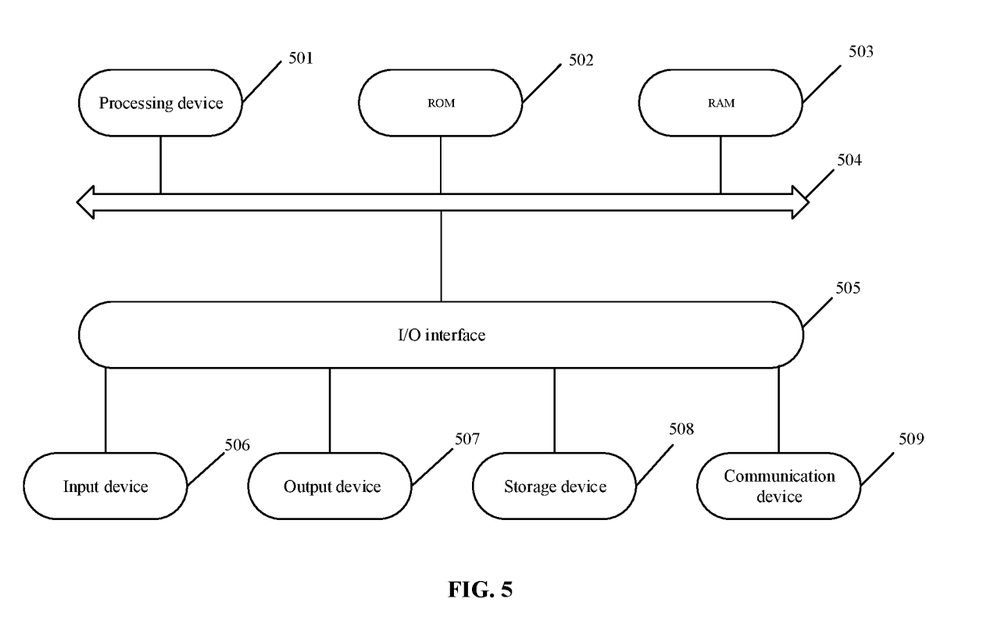
FIG. 5 shows a schematic diagram of a connection structure of an electronic device according to an embodiment of the present disclosure.

Refer to FIG. 5, which shows a schematic structural diagram of an electronic device adapted to be used to implement embodiments of the present disclosure. The electronic device in the embodiment of the present disclosure may include but is not limited to a mobile terminal, such as a mobile phone, a notebook computer, a digital broadcast receiver, a personal digital assistant (PDA), a tablet computer (PAD), a portable multimedia player (PMP), an onboard terminal (such as an onboard navigation terminal), and a fixed terminal, such as a digital TV and a desktop computer. The electronic device shown in FIG. 5 is only an example, and should not limit the function and application range of the embodiments of the present disclosure.

As shown in FIG. 5, the electronic device may include a processing device 501 (such as a central processing unit, a graphics processing unit, or the like) that may perform various appropriate actions and processing according to a program stored in a read-only memory (ROM) 502 or a program loaded from a storage device 508 into a random-access memory (RAM) 503. In the RAM 503, various programs and data required for operation of the electronic device are further stored. The processing device 501, the ROM 502, and the RAM 503 are connected to each other using a bus 504. An input/output (I/O) interface 505 is also connected to the bus 504.

Generally, the following devices may be connected to the I/O interface 505: input devices 506 including, for example, a touchscreen, a touchpad, a keyboard, a mouse, a camera, a microphone, an accelerometer, and a gyroscope; output devices 507 including, for example, a liquid crystal display (LCD), a loudspeaker and a vibrator; storage devices 508 including, for example, a tape or a hard disk; and a communication device 509. The communication device 509 may allow the electronic device to communicate wirelessly or wiredly with another device to exchange data. Although FIG. 5 shows an electronic device with various devices, it should be understood that it is not required to implement or provide all shown devices. Alternatively, more or fewer devices may be implemented or provided.

In particular, according to the embodiments of the present disclosure, the process described above with reference to the flowchart may be implemented as a computer software program. For example, an embodiment of the present disclosure includes a computer software program product that includes a computer program carried on a non-transitory readable medium, and the computer program includes program codes used to perform the method shown in the flowchart. In such an embodiment, the computer program may be downloaded and installed from a network by using the communication device 509, installed from the storage device 508, or installed from the ROM 502. When the computer program is executed by the processing device 501, the foregoing functions defined in the method in the embodiments of the present disclosure are executed.

It should be noted that the foregoing computer-readable medium in the present disclosure may be a computer-readable signal medium, a computer-readable storage medium, or any combination of the two. The computer-readable storage medium may be, for example, an electrical, magnetic, optical, electromagnetic, infrared, or semiconductor system, apparatus, or device, or any combination thereof. More specific examples of the computer-readable storage medium may include but are not limited to: an electrical connection having one or more conducting wires, a portable computer disk, a hard disk, a random-access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof. In the present disclosure, the computer-readable storage medium may be any tangible medium that includes or stores a program, and the program may be used by or in combination with an instruction execution system, apparatus, or device. In the present disclosure, the computer-readable signal medium may include a data signal propagated in a baseband or as a part of a carrier, which carries computer-readable program codes. Such a propagated data signal may be in multiple forms, including but not limited to an electromagnetic signal, an optical signal, or any suitable combination thereof. The computer-readable signal medium may further be any computer-readable medium other than the computer-readable storage medium, and the computer-readable signal medium may send, propagate, or transmit a program that is used by or in combination with an instruction execution system, apparatus, or device. The program code included in the computer-readable medium may be transmitted by using any suitable medium, including but not limited to: a wire, an optical cable, a radio frequency (RF), or any suitable combination thereof.

In some embodiments, the client and the server can communicate by using any currently known or future-developed network protocol, for example, a Hyper Text Transfer Protocol (HTTP), and can be interconnected by a digital data communication (e.g., communication network) of any form or any medium. Examples of the communication network include a local area network (LAN), a wide area network (WAN), an internet network (for example, the Internet), and an end-to-end network (for example, an ad hoc end-to-end network), and any currently known or future-developed network.

The computer readable medium may be included in the foregoing electronic device, or may exist separately and not be assembled into the electronic device.

Computer program codes for performing the operations of the present disclosure may be written in one or more programming languages or a combination thereof, such as object-oriented programming languages Java, Smalltalk, C++, and conventional procedural programming languages such as "C" or similar program design languages. The program codes may be executed completely on a user computer, partially on a user computer, as an independent package, partially on a user computer and partially on a remote computer, or completely on a remote computer or server. In cases involving a remote computer, the remote computer may be connected to a user computer through any type of network, including a local area network (LAN) or a wide area network (WAN), or may be connected to an external computer (for example, through the Internet by using an Internet service provider).

Flowcharts and block diagrams in the accompanying drawings illustrate possible architectures, functions, and operations of systems, methods, and computer program products according to various embodiments of the present disclosure. In this regard, each block in a flowchart or block diagram may represent a module, program segment, or part of code that includes one or more executable instructions for implementing a specified logical function. It should also be noted that in some alternative implementations, functions marked in the block may also occur in different order than those marked in the accompanying drawings. For example, two blocks represented in succession may actually be executed in substantially parallel, and they may sometimes be executed in a reverse order, depending on the functions involved. It should also be noted that each block in the block diagram and/or flowchart and a combination of blocks in the block diagram and/or flowchart may be implemented by using a dedicated hardware-based system that performs a specified function or operation, or may be implemented by using a combination of dedicated hardware and a computer instruction.

The units described in embodiments of the present disclosure may be implemented either by means of software or by means of hardware. The names of these units do not limit the units themselves under certain circumstances.

Various functions described herein above can be implemented by one or more hardware logic members. For example and without limitations thereto, an exemplary hardware logic member includes a field programmable gate array (FPGA), an application-specific integrated circuit (ASIC), an application-specific standard product (ASSP), a system-on-chip system (SOC), a complex programmable logic device (CPLD) or the like.

In the context of the present disclosure, a machine-readable medium may be a tangible medium that may contain or store a program for use by or in connection with an instruction execution system, apparatus or device. The machine-readable medium may be a machine-readable signal medium or a machine-readable storage medium. Machine-readable media may include, but are not limited to, electronic, magnetic, optical, electromagnetic, infrared, or semiconductor systems, apparatuses or devices, or any suitable combination thereof. More specific examples of machine-readable storage medium would include one or more wire-based electrical connections, portable computer disks, hard disks, random-access memories (RAMs), read-only memories (ROMs), erasable programmable read-only memories (EPROM or flash memories), fiber optics, portable compact disk read only memories (CD-ROMs), optical storage devices, magnetic storage devices, or any suitable combination thereof.

The units described in embodiments of the present disclosure may be implemented either by means of software or by means of hardware. The names of these units do not limit the units themselves under certain circumstances.

What is claimed is:

1. An obstacle avoidance method for a self-propelled device, comprising:
   acquiring a suspension height of an obstacle on a current travel route during traveling;
   determining whether the suspension height of the obstacle is within a preset limited height range, wherein the preset limited height range enables a part of the self-propelled device to pass the suspension height and an other part of the self-propelled device is limited by the suspension height; and
   acquiring, in response to determining that the suspension height of the obstacle is within the preset limited height range, current traveling state information of the self-propelled device, and determining whether to adjust the current travel route based on the current traveling state information to avoid the obstacle;
   wherein the current traveling state information comprises: a driving current value of a traveling wheel of the self-propelled device, a rotational speed value of the traveling wheel and a displacement speed value of the self-propelled device on the current travel route;
   wherein acquiring the current traveling state information of the self-propelled device, and determining whether to adjust the current travel route based on the current traveling state information comprises:
   acquiring, in response to the self-propelled device traveling to a position of the obstacle, the driving current value, the displacement speed value and the rotational speed value of each traveling wheel of the self-propelled device;
   obtaining a second abnormal current threshold based on a preset first abnormal current threshold and a preset percentage; and
   determining to adjust the current travel route in response to determining that the driving current value is greater than a preset normal current threshold and is less than the second abnormal current threshold, and the displacement speed value is mismatched with the rotational speed value of at least one traveling wheel.

2. The method of claim 1, wherein acquiring the suspension height of the obstacle on the current travel route comprises:
   acquiring, by a structured light assembly arranged in the self-propelled device, the suspension height of the obstacle on the current travel route.

3. The method of claim 2, wherein acquiring the suspension height of the obstacle on the current travel route by the structured light assembly arranged in the self-propelled device, comprises:
   emitting, by a line structured light sensor of the structured light assembly, at least one beam of line structured light to the current travel route;
   acquiring, by a camera of the structured light assembly, an image comprising the at least one beam of line structured light;
   generating, based on a plurality of images comprising the at least one beam of line structured light, three-dimensional space information of the obstacle on the current travel route; and
   obtaining the suspension height of the obstacle based on a positional relationship between the three-dimensional space information of the obstacle and three-dimensional space information of an entire field of view of the structured light assembly, wherein the three-dimensional space information of the entire field of view refers to three-dimensional space information of entire measurement field of view acquired by the structured light assembly.

4. The method of claim 3, wherein, when the self-propelled device is on a horizontal plane and the line structured light sensor emits a plurality of beams of line structured light, at least two beams of line structured light of the plurality of beams of line structured light have an intersection line perpendicular to the horizontal plane.

5. The method of claim 1, wherein acquiring the current traveling state information of the self-propelled device, and determining whether to adjust the current travel route of the self-propelled device based on the current traveling state information, comprises:
   acquiring the current traveling state information of the self-propelled device; and
   determining to adjust the current travel route in response to determining that the current traveling state information comprises surmounting-obstacle state information.

6. The method of claim 1, wherein
   acquiring the current traveling state information of the self-propelled device, and determining whether to adjust the current travel route based on the current traveling state information, comprises:
   acquiring, in response to the self-propelled device traveling to the position of the obstacle, the driving current value and the displacement speed value of the self-propelled device; and
   determining to adjust the current travel route in response to determining that the driving current value is greater than a preset first abnormal current threshold and the displacement speed value is zero.

7. The method of claim 1, further comprising: acquiring and marking the position of the obstacle.

8. The method of claim 7, further comprising:
   transmitting the position of the obstacle to a cloud server or a local server.

9. The method of claim 7, further comprising:
   saving the position of the obstacle in a memory of the self-propelled device.

10. A non-transitory computer-readable storage medium storing a computer program thereon, which, when the program is executed by a processor, causes the processor to implement acts comprising:
    acquiring a suspension height of an obstacle on a current travel route during traveling of a self-propelled device;
    determining whether the suspension height of the obstacle is within a preset limited height range, wherein the preset limited height range enables a part of the self-propelled device to pass the suspension height and an other part of the self-propelled device is limited by the suspension height; and
    acquiring, in response to determining that the suspension height of the obstacle is within the preset limited height range, current traveling state information of the self-propelled device, and determining whether to adjust the current travel route based on the current traveling state information to avoid the obstacle;
    wherein the current traveling state information comprises: a driving current value of a traveling wheel of the self-propelled device, a rotational speed value of the traveling wheel and a displacement speed value of the self-propelled device on the current travel route;

wherein acquiring the current traveling state information of the self-propelled device, and determining whether to adjust the current travel route based on the current traveling state information comprises:

acquiring, in response to the self-propelled device traveling to a position of the obstacle, the driving current value, the displacement speed value and the rotational speed value of each traveling wheel of the self-propelled device;

obtaining a second abnormal current threshold based on a preset first abnormal current threshold and a preset percentage; and determining to adjust the current travel route in response to determining that the driving current value is greater than a preset normal current threshold and is less than the second abnormal current threshold, and the displacement speed value is mismatched with the rotational speed value of at least one traveling wheel.

11. A self-propelled device, comprising:

one or more processors; and a storage device configured to store one or more programs, which, when executed by the one or more processors, enables the one or more processors to implement acts comprising:

acquiring a suspension height of an obstacle on a current travel route during traveling;

determining whether the suspension height of the obstacle is within a preset limited height range, wherein the preset limited height range enables a part of the self-propelled device to pass the suspension height and an other part of the self-propelled device is limited by the suspension height; and acquiring, in response to determining that the suspension height of the obstacle is within the preset limited height range, current traveling state information of the self-propelled device, and determining whether to adjust the current travel route based on the current traveling state information to avoid the obstacle;

wherein the current traveling state information comprises: a driving current value of a traveling wheel of the self-propelled device, a rotational speed value of the traveling wheel and a displacement speed value of the self-propelled device on the current travel route;

wherein acquiring the current traveling state information of the self-propelled device, and determining whether to adjust the current travel route based on the current traveling state information comprises:

acquiring, in response to the self-propelled device traveling to a position of the obstacle, the driving current value, the displacement speed value and the rotational speed value of each traveling wheel of the self-propelled device;

obtaining a second abnormal current threshold based on a preset first abnormal current threshold and a preset percentage; and determining to adjust the current travel route in response to determining that the driving current value is greater than a preset normal current threshold and is less than the second abnormal current threshold, and the displacement speed value is mismatched with the rotational speed value of at least one traveling wheel.

12. The self-propelled device of claim 11, wherein acquiring the suspension height of the obstacle on the current travel route comprises:

acquiring, by a structured light assembly arranged in the self-propelled device, the suspension height of the obstacle on the current travel route.

13. The self-propelled device of claim 12, wherein acquiring the suspension height of the obstacle on the current travel route by the structured light assembly arranged in the self-propelled device, comprises:

emitting, by a line structured light sensor of the structured light assembly, at least one beam of line structured light to the current travel route;

acquiring, by a camera of the structured light assembly, an image comprising the at least one beam of line structured light;

generating, based on a plurality of images comprising the at least one beam of line structured light, three-dimensional space information of the obstacle on the current travel route; and obtaining the suspension height of the obstacle based on a positional relationship between the three-dimensional space information of the obstacle and three-dimensional space information of an entire field of view of the structured light assembly, wherein the three-dimensional space information of the entire field of view refers to three-dimensional space information of entire measurement field of view acquired by the structured light assembly.

14. The self-propelled device of claim 13, wherein, when the self-propelled device is on a horizontal plane and the line structured light sensor emits a plurality of beams of line structured light, at least two beams of line structured light of the plurality of beams of line structured light have an intersection line perpendicular to the horizontal plane.

15. The self-propelled device of claim 11, wherein acquiring the current traveling state information of the self-propelled device, and determining whether to adjust the current travel route of the self-propelled device based on the current traveling state information, comprises:

acquiring the current traveling state information of the self-propelled device; and determining to adjust the current travel route in response to determining that the current traveling state information comprises surmounting-obstacle state information.

16. The self-propelled device of claim 11, wherein the one or more processors further implements following operations:

acquiring the current traveling state information of the self-propelled device, and determining whether to adjust the current travel route based on the current traveling state information, comprises:

acquiring, in response to the self-propelled device traveling to the position of the obstacle, the driving current value and the displacement speed value of the self-propelled device; and determining to adjust the current travel route in response to determining that the driving current value is greater than a preset first abnormal current threshold and the displacement speed value is zero.

17. The self-propelled device of claim 11, wherein the one or more processors are further configured to execute the one or more programs to implement acts comprising:

acquiring and marking the position of the obstacle.

18. The self-propelled device of claim 17, wherein the one or more processors are further configured to execute the one or more programs to implement acts comprising:
   transmitting the position of the obstacle to a cloud server or a local server; or
   saving the position of the obstacle in a memory of the self-propelled device.

\* \* \* \* \*